US010082931B2

(12) United States Patent
Douglas et al.

(10) Patent No.: US 10,082,931 B2
(45) Date of Patent: Sep. 25, 2018

(54) TRANSITIONING COMMAND USER INTERFACE BETWEEN TOOLBAR USER INTERFACE AND FULL MENU USER INTERFACE BASED ON USE CONTEXT (71) Applicant: Microsoft Technology Licensing, LLC, Redmond, WA (US)

(72) Inventors: Malia Douglas, Sammamish, WA (US); Qixing Zheng, Redmond, WA (US); Rebecca Haruyama, Redmond, WA (US); Jason Blackheart, Redmond, WA (US); Ruediger Kinast, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 14/738,713

(22) Filed: Jun. 12, 2015

(65) Prior Publication Data
US 2016/0364090 A1    Dec. 15, 2016

(51) Int. Cl.
*G06F 3/0482* (2013.01)
*G06F 3/048* (2013.01)

(52) U.S. Cl.
CPC ............ *G06F 3/0482* (2013.01); *G06F 3/048* (2013.01)

(58) Field of Classification Search
CPC .................................................. G06F 3/0482
See application file for complete search history.

(56) References Cited

U.S. PATENT DOCUMENTS

| 6,133,915 A * | 10/2000 | Arcuri ............... G06F 3/0481 715/779 |
| 6,232,972 B1 | 5/2001 | Arcuri et al. |
| 6,622,119 B1 * | 9/2003 | Ramaswamy ........ G06F 17/276 704/275 |
| 6,825,859 B1 | 11/2004 | Severenuk et al. |
| 7,721,228 B2 | 5/2010 | Burke et al. |
| 8,707,196 B2 | 4/2014 | Bekelman |
| 2004/0268259 A1 * | 12/2004 | Rockey ............... G06F 9/4446 715/708 |
| 2005/0204309 A1 * | 9/2005 | Szeto ................. H04L 12/5845 715/811 |

(Continued)

OTHER PUBLICATIONS

"Mail in Outlook Web App", Retrieved on: Apr. 21, 2015 Available at: https://support.office.com/en-us/article/Mail-in-Outlook-Web-App-ed7b1cb9-ef40-4fbd-a302-278cc7f4dcf5.

(Continued)

*Primary Examiner* — William Bashore
*Assistant Examiner* — Nathan Shrewsbury
(74) *Attorney, Agent, or Firm* — Michael Best & Friedrich LLP (57) ABSTRACT

Transitioning of a command user interface (UI) between a toolbar UI and a full menu UI based on a use context is provided. An application such as a messaging application detects a request to interact with a message. A presentation mode is identified based on the use context associated with the request. The use context includes a reading mode or an authoring mode. A command UI is generated based on the presentation mode. The command UI includes a toolbar UI for the reading mode or a full menu UI for the authoring mode. The command UI is displayed in proximity to the message within a messaging UI.

18 Claims, 7 Drawing Sheets

(56) References Cited

U.S. PATENT DOCUMENTS

| | | | |
|---|---|---|---|
| 2006/0036945 A1* | 2/2006 | Radtke | G06F 9/4443 715/708 |
| 2006/0139312 A1* | 6/2006 | Sinclair, II | G06F 3/0481 345/156 |
| 2007/0271340 A1* | 11/2007 | Goodman | G06Q 10/107 709/206 |
| 2008/0056071 A1* | 3/2008 | Burtner | G06Q 10/10 368/28 |
| 2008/0189622 A1* | 8/2008 | Sanchez | G06Q 10/06 715/752 |
| 2009/0150858 A1* | 6/2009 | Goyal | G06F 8/35 717/104 |
| 2009/0271735 A1 | 10/2009 | Anderson et al. | |
| 2009/0303177 A1 | 12/2009 | Chou et al. | |
| 2010/0057864 A1* | 3/2010 | Laird-McConnell | G06F 17/30905 709/206 |
| 2010/0192074 A1 | 7/2010 | Fung et al. | |
| 2010/0205259 A1* | 8/2010 | Vitaldevara | G06Q 10/107 709/206 |
| 2010/0251119 A1* | 9/2010 | Geppert | G06F 3/04817 715/716 |
| 2011/0072492 A1* | 3/2011 | Mohler | G06F 3/04817 726/3 |
| 2011/0265027 A1 | 10/2011 | Lipstein et al. | |
| 2012/0066642 A1 | 3/2012 | Shi | |
| 2012/0120000 A1* | 5/2012 | Lucic | G06F 1/1626 345/173 |
| 2012/0127082 A1* | 5/2012 | Kushler | G06F 3/04886 345/169 |
| 2012/0159375 A1 | 6/2012 | Shaw et al. | |
| 2013/0019174 A1* | 1/2013 | Gil | G06F 3/04812 715/711 |
| 2013/0238724 A1 | 9/2013 | Cunningham | |
| 2013/0318466 A1 | 11/2013 | Estrada et al. | |
| 2014/0019896 A1 | 1/2014 | Satterfield et al. | |
| 2014/0089822 A1* | 3/2014 | Wu | G06Q 10/06 715/761 |
| 2014/0201672 A1 | 7/2014 | Borzello et al. | |
| 2014/0282254 A1 | 9/2014 | Feiereisen et al. | |
| 2014/0331168 A1 | 11/2014 | Wang et al. | |
| 2016/0262128 A1* | 9/2016 | Hailpern | G06F 17/00 |

OTHER PUBLICATIONS

"Android Office User Manual—Kingsoft Office", Published on: May 10, 2012 Available at: http://www.kingsoftstore.com/download/android-user-manual-9.pdf.

Sinofsky, Steven, "Building Windows 8", Published on: Aug. 29, 2011 Available at: http://blogs.msdn.com/b/b8/archive/2011/08/26/improvements-in-windows-explorer.aspx.

"International Search Report and Written Opinion Issued in PCT Application No. PCT/US2016/035952", dated Aug. 25, 2016, 13 Pages.

* cited by examiner

TRANSITIONING COMMAND USER INTERFACE BETWEEN TOOLBAR USER INTERFACE AND FULL MENU USER INTERFACE BASED ON USE CONTEXT

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from communication applications to complicated analysis tools. Many such applications display a communications message. Commands with operations to manage the communications message are also presented through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to transitioning of a command user interface (UI) between a toolbar UI and a full menu UI based on a use context. In some examples, a messaging application may detect a request to interact with a message. A presentation mode may be identified based on the use context associated with the request. The use context may include a reading mode or an authoring mode. A command UI may be generated based on the presentation mode. The command UI may include a toolbar UI for the reading mode or a full menu UI for the authoring mode. The command UI may be displayed in proximity to the message within a messaging UI.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a command user interface (UI) may be transitioned between a toolbar UI and a full menu UI based on a use context by a messaging application. The messaging application may detect a request to interact with a message. The request may include an intent to read the message or an intent to author the message. A presentation mode may be identified based on the use context associated with the request. The use context may include a reading mode or an authoring mode.

A command UI may be generated based on the presentation mode. The command UI may include a toolbar UI for the reading mode or a full menu UI for the authoring mode. The toolbar UI may include reading mode commands with operations to consume the message. The full menu UI may include authoring mode commands that are partitioned to a format commands menu, an insert commands menu, or a review commands menu. The command UI may be displayed in proximity to the message within a messaging UI.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to transition a command UI between a toolbar UI and a full menu UI based on a use context. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
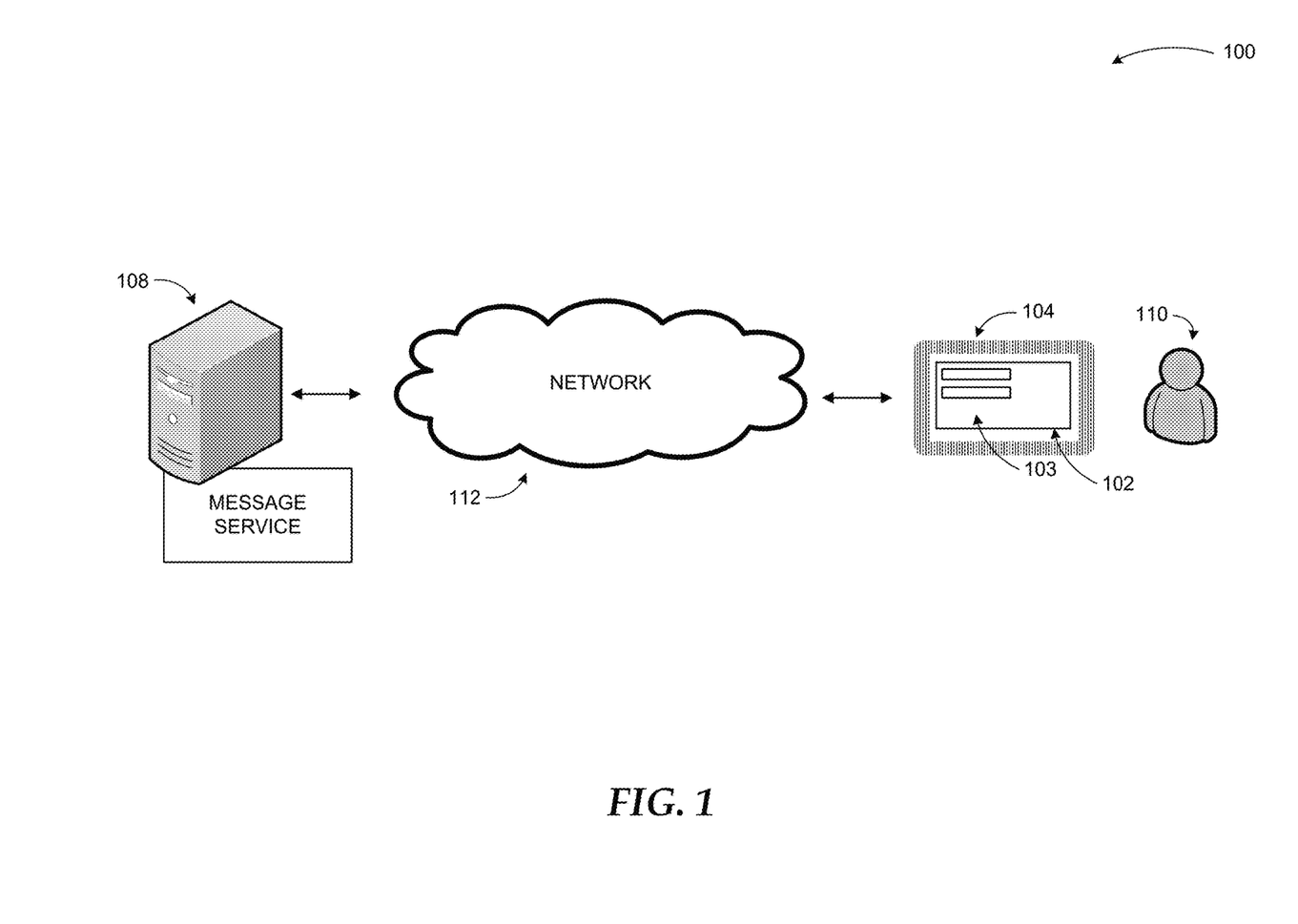
FIG. 1 is a conceptual diagram illustrating an example of transitioning of a command user interface (UI) between a toolbar UI and a full menu UI based on a use context, according to embodiments.

FIG. 1 is a conceptual diagram illustrating an example of transitioning of a command UI between a toolbar UI and a full menu UI based on a use context, according to embodiments, according to embodiments.

In a diagram 100, a computing device 104 may execute a messaging application 102. The computing device 104 may include a tablet device, a laptop computer, a desktop computer, and a smart phone, among others. The computing device 104 may display the messaging application 102 to a user 110. The user 110 may be allowed to interact with the messaging application 102 through an input device or touch enabled display component of the computing device 104. The computing device 104 may include a display device such as the touch enabled display component, and a monitor, among others to provide a messaging UI 103 of the messaging application 102 to the user 110.

The messaging application 102 may identify a presentation mode based on a use context associated with a request to interact with a message (i.e.: an email). The use context may include a number of attributes associated with a consumption of the message. The attributes may include a screen size of the computing device 104, an orientation of a screen of the computing device 104, and a historical use pattern while consuming the message, among other attributes. The request may be received from the user 110. The request may include an intent to read the message or an intent to author the message.

A command UI may be generated based on the presentation mode. The presentation mode may describe an arrangement of the displayed components of the messaging application. A reading mode that arranges the displayed components based on a reading function may be an example of the presentation mode. An authoring mode that arranges displayed components based on an authoring function may be another example of the presentation mode.

The command UI may include a toolbar UI for the reading mode or a full menu UI for the authoring mode. The toolbar UI may include a limited number of commands displayed in a layer. The layer may include a single line of commands displayed in a vertical arrangement, or a horizontal arrangement, among others. The full menu UI may include commands partitioned based on related functions such as formatting, inserting, or reviewing, among others. The messaging application 102 may display the command UI that provides commands with operations to manage the message based on the presentation mode.

The user 110 may interact with the messaging application 102 with a keyboard based input, a mouse based input, a voice based input, a pen based input, and a gesture based input, among others. The gesture based input may include one or more touch based actions such as a touch action, a swipe action, and a combination of each, among others.

The messaging application 102 may store the message locally. Alternatively, the message may be retrieved from a message service hosted by a server 108. The server 108 may include an email server, among others. The computing device 104 may communicate with the server 108 through a network 112. The network 112 may provide wired or wireless communications between nodes such as the computing device 104, or the server 108, among others.

While the example system in FIG. 1 has been described with specific components including the computing device 104, the messaging application 102, embodiments are not limited to these components or system configurations and can be implemented with other system configuration employing fewer or additional components.

Figure 2:
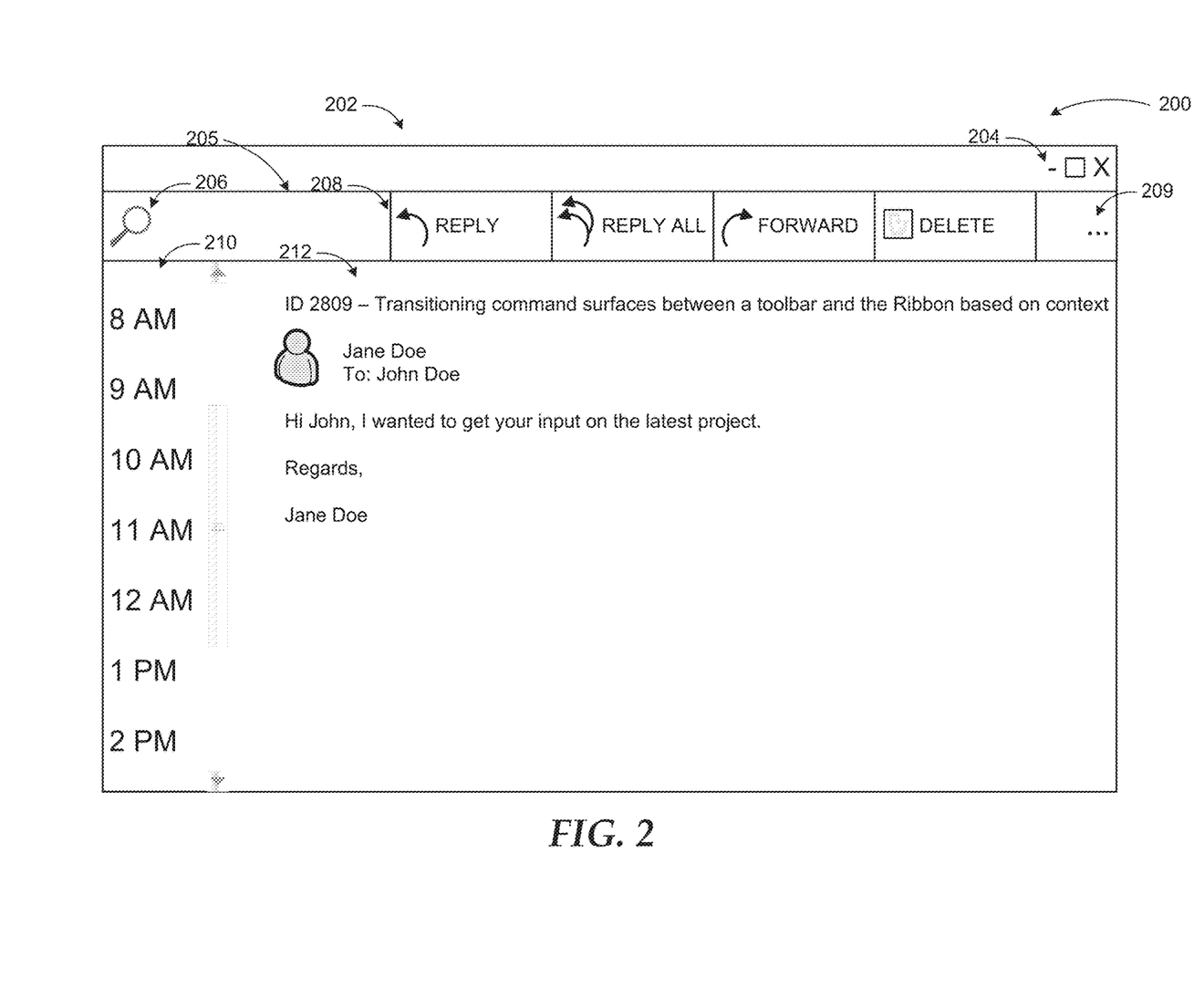
FIG. 2 illustrates an example of a messaging application that displays a toolbar UI with commands to manage operations associated with a reading mode of a displayed message, according to embodiments.

FIG. 2 illustrates an example of a messaging application that displays a toolbar UI with commands to manage operations associated with a reading mode of a displayed message, according to embodiments.

In a diagram 200, a messaging application 202 may display UI components to allow a user to interact with a message. The UI components may include commands, or text boxes, among others. The messaging application 202 may display a toolbar UI 205 in response to identifying a presentation mode of a message 212 as a reading mode.

The toolbar UI 205 may include reading mode commands 208 such as a reply command, a reply to all command, a forward command, a delete command, or a search command 206, among others. The toolbar UI 205 may be used for a limited number of commands. The commands may be limited based on an available screen real estate within a messaging UI of the messaging application 202. As such, a subset of the reading mode commands 208 may be displayed. A hidden set of the reading mode commands 208 may be made available through a menu command 209. In response to an activation of the menu command 209, a menu that includes the hidden set of the reading mode commands 208 may be displayed in a menu component.

The toolbar UI 205 may be displayed in a horizontal arrangement or a vertical arrangement, among others. The reading mode commands 208 may be displayed in a layer within the toolbar UI 205. The reading mode commands 208 may be placed in a single line within the layer.

The messaging application 202 may also display controls such as a time navigation control to display messages received within a time period. User interface management controls 204 may also be displayed to minimize, maximize or close the messaging UI of the messaging application 202.

The messaging application 202 may analyze a request transmitted by a user. The request may include an intent to read the message 212. The intent may include a read selection to read the message 212 or a read command to read the message 212.

The messaging application 202 may also analyze a screen size of a display device that renders the message UI. The screen size may be detected as within a range that includes a mobile device screen. The mobile device screen may have a smaller screen size compared to mobility restricted display devices. An example of the mobile device screen may include a screen of a smartphone, or a tablet, among others.

The presentation mode may be identified as the reading mode because of a limited screen size of the mobile device. The limited screen size may restrict number of commands to display for management of the message 212. As such, the reading mode commands 208 may be displayed on the toolbar UI 205 to present the toolbar UI 205 as the command UI.

Figure 3:
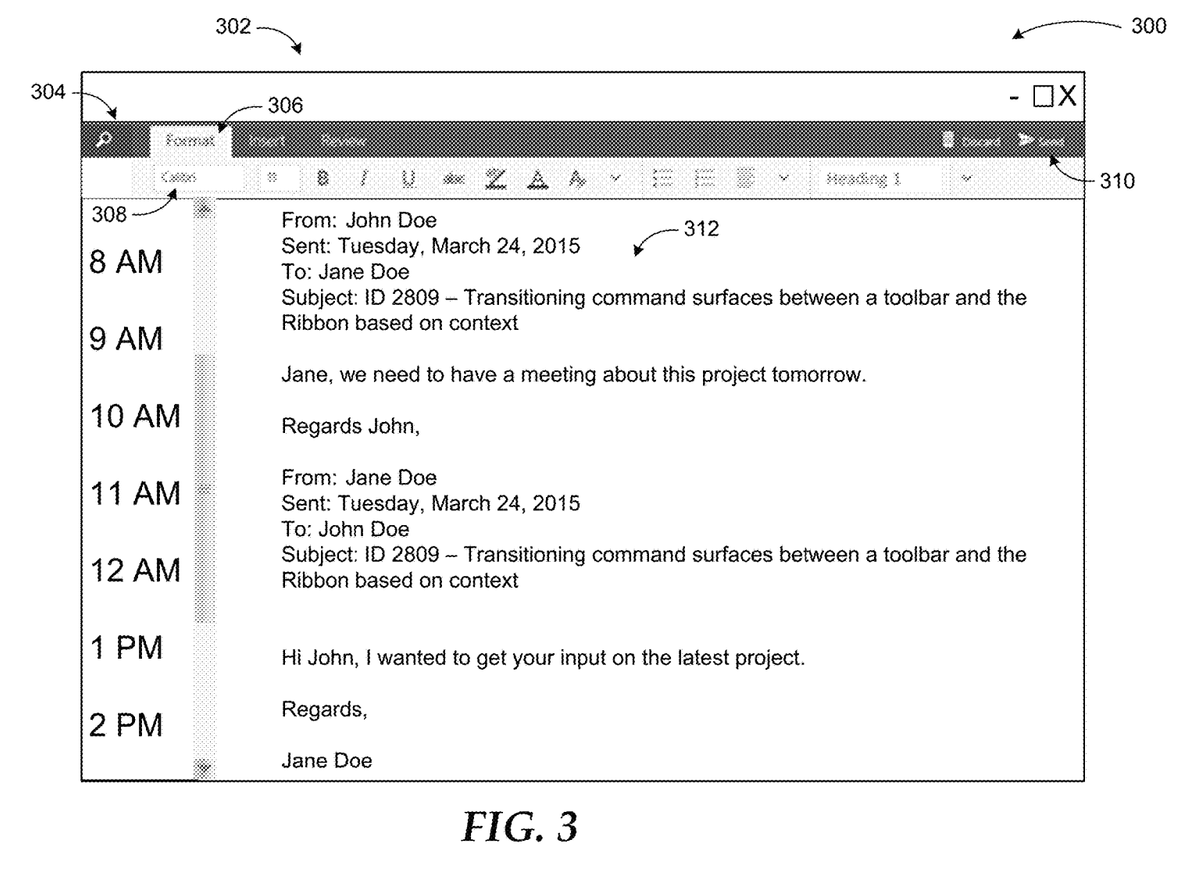
FIG. 3 illustrates an example of a messaging application that displays a full menu UI with commands to manage operations associated with an authoring mode of a displayed message, according to embodiments.

FIG. 3 illustrates an example of a messaging application that displays a full menu UI with commands to manage operations associated with an authoring mode of a displayed message, according to embodiments.

In a diagram 300, a messaging application 302 may display a full menu UI 304 in response to detecting a presentation mode of message 312 as an authoring mode. A request from a user to interact with the message 312 may be analyzed to detect an intent to author the message 312. The intent may include an authoring selection to author the message 312, or an authoring command to author the message 312, among others.

Authoring mode commands 308 may be placed on the full menu UI 304 to present the full menu UI as a command UI. The authoring mode commands 308 may be partitioned to command menus 306. The command menus 306 may include a format commands menu, an insert commands menu, or a review commands menu, among others. The authoring mode commands placed on the commands menu 306 may be displayed in multiple layers.

The format commands menu may include format commands with operations to modify a format of a content of the message 312. The insert commands menu may include insert commands with operations to insert a new content into the message 312. The new content may include text, images, or attachments, among others. The review commands menu may include review commands with operation to review changes to the content of the message 312. The review commands may identify the changes with highlights, or timestamps, among other markers. Common authoring mode commands 310 may also be displayed to provide operations to transmit, or discard, among other operations to manage the message 312.

The messaging application 302 may also analyze the screen size of a display device that renders a messaging UI of the messaging application 302. The screen size may be detected as larger than a range that includes a mobile device screen. A mobility restricted screen may be identified as having a screen size larger than the mobile device screen. An example of the mobility restricted screen may include a monitor, a projector, a television, among others. The presentation mode may be identified as the authoring mode because of the large screen size. The large screen size may provide additional screen real estate to display authoring mode commands 308 in multiple layers. As such, the authoring mode commands 308 may be displayed on the full menu UI 304 to present the full menu UI 304 as the command UI.

Figure 4:
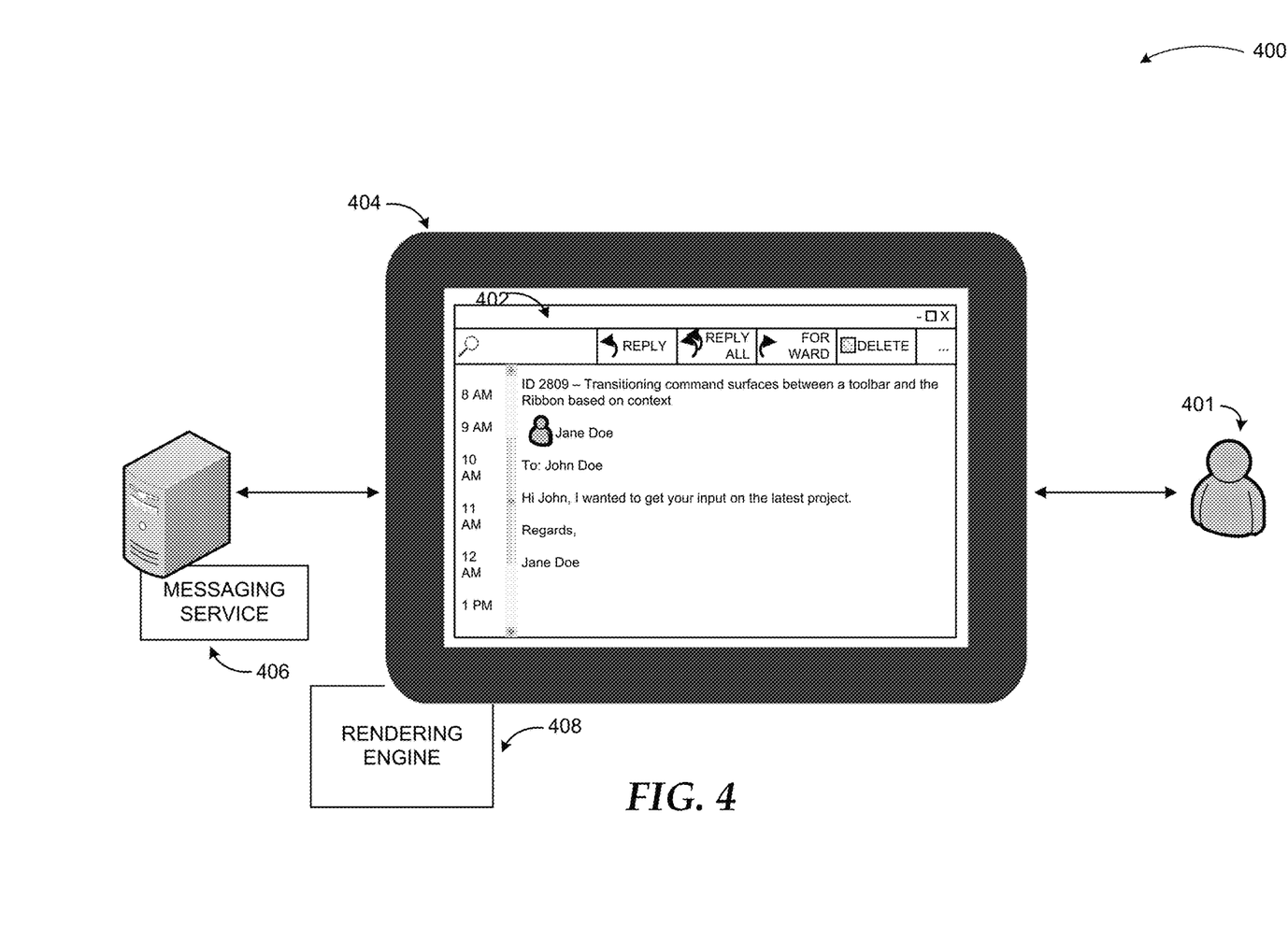
FIG. 4 illustrates a component diagram of a system that transitions between a toolbar UI or a full menu UI based on a use context associated with a message, according to embodiments.

FIG. 4 illustrates a component diagram of a system that transitions between a toolbar UI or a full menu UI based on a use context associated with a message, according to embodiments.

In a diagram 400, a messaging application 402 may display a messaging UI that transitions between a toolbar UI and a full menu UI to present commands to manage a message. A rendering engine 408 may detect a use context of the message based on a request from a user 401, or a screen size of a computing device 404, among other use contexts. A presentation mode of the message may be identified based on the use context. The presentation mode may include a reading mode or an authoring mode. The toolbar UI may be generated for the reading mode. The full menu UI may be generated for the authoring mode.

The message may be stored locally in the computing device 404. Alternatively, the message may be retrieved or stored in a messaging service 406 that hosts messages.

An application platform of a messaging UI of the messaging application 402 may be detected as a mobile application. In response, the reading mode may be identified as the presentation mode. Reading mode commands may be placed on the toolbar UI to present the toolbar UI as the command UI. A subset of the reading mode commands may be positioned on the toolbar UI based on a display size of the toolbar UI. A remaining subset of the reading mode commands may be set aside as a hidden set. A menu command may be positioned on the toolbar UI with operations to display the hidden set of the reading mode commands. A menu that includes the hidden set of the reading mode commands may be displayed in response to an activation of the menu command.

The application platform of the messaging UI may also be detected as a desktop application. In response, the authoring mode may be identified as the presentation mode. Authoring mode commands may be placed on the full menu UI to present the full menu UI as the command UI. The authoring mode commands may be partitioned to a format commands menu, an insert commands menu, or a review commands menu, among others. The format commands menu may be displayed as selected by default.

The application platform of the messaging UI may also be detected as a web based application. In response, the authoring mode may be identified based on a screen size of the computing device 404 that displays the web based application. A reading mode may be selected to generate a toolbar UI in response to detecting the screen size as within a range associated with a mobile device. An authoring mode may be selected to generate a full menu UI in response to detecting the screen size as larger than a range associated with a mobile device.

A toolbar UI may be changed to a full menu UI based on a use context change from a reading mode to an authoring mode of the message. Alternatively, a full menu UI may be changed to a toolbar UI based on a use context change from an authoring mode to a reading mode of the message.

According to embodiments described herein, the technical advantage of transitioning a command UI between a toolbar UI and a full menu UI based on a use context may include improved usability of a messaging UI and use context based optimized commands with operations to manage the message. Transitioning between a toolbar UI and a full menu UI may address a need that arises from use of variety of devices and consumption goals. Transitioning a command UI between a toolbar UI and a full menu UI based on use context may streamline management of messages compared to cumbersome legacy menu driven command UI solutions.

Embodiments address a need that arises from very large scale of operations created by messaging services that cannot be managed by humans. The actions/operations described herein are not a mere use of a computer, but address results of a system that is a direct consequence of software used as a service such as a message application offered in conjunction with transitioning a command UI between a toolbar UI and a full menu UI based on a use context.

The example scenarios and schemas in FIG. 1 through 4 are shown with specific components, data types, and configurations. Embodiments are not limited to systems according to these example configurations. Transitioning a command UI between a toolbar UI and a full menu UI based on a use context may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
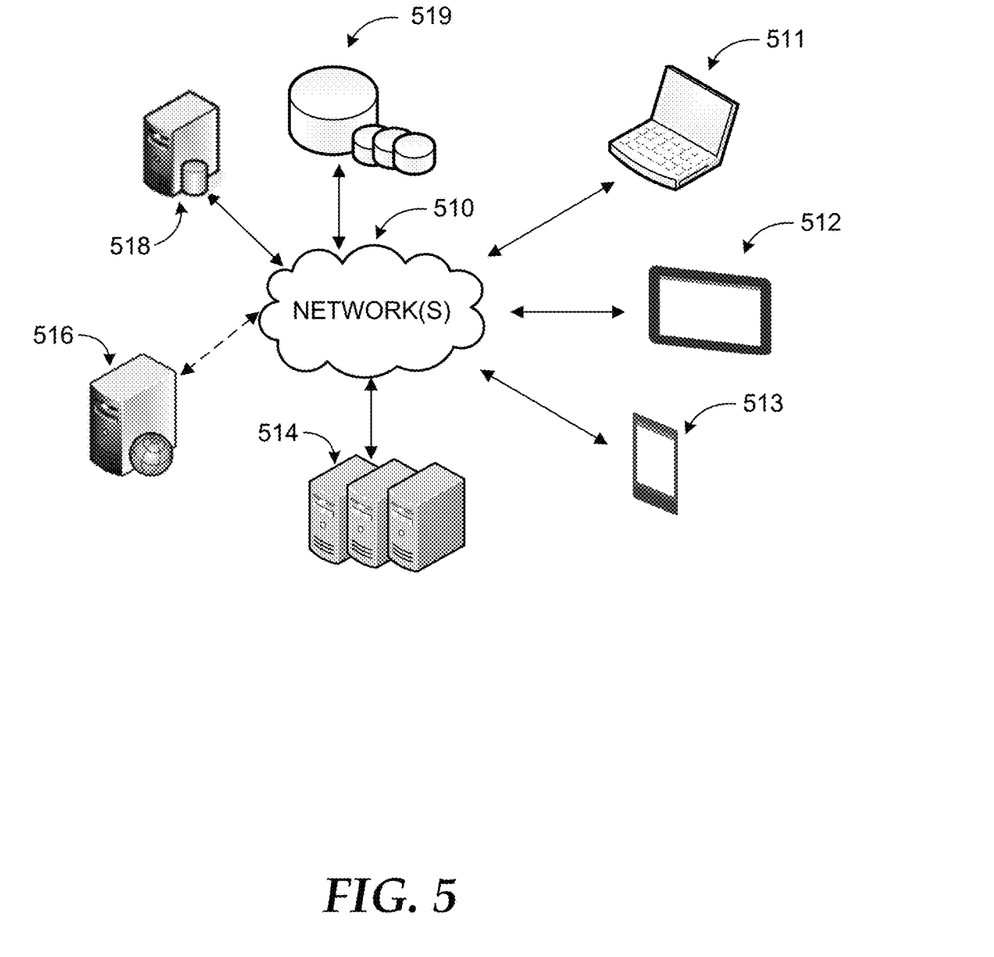
FIG. 5 is a simplified networked environment, where a system according to embodiments may be implemented.

FIG. 5 is an example networked environment, where embodiments may be implemented. A messaging application configured to transition a command UI between a toolbar UI and a full menu UI based on a use context may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A messaging application may detect a request to interact with a message. A presentation mode may be identified based on a use context associated with the request. The use context may include a reading mode or an authoring mode. A command UI may be generated based on the presentation mode. The command UI may include a toolbar UI for the reading mode or a full menu UI for the authoring mode. The command UI may be displayed in proximity to the message within a messaging UI. The messaging application may store data associated with the use context in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to transition a command UI between a toolbar UI and a full menu UI based on a use context. Furthermore, the networked environments discussed in FIG. 5 are for illustration purposes only. Embodiments are not limited to the example applications, modules, or processes.

Figure 6:
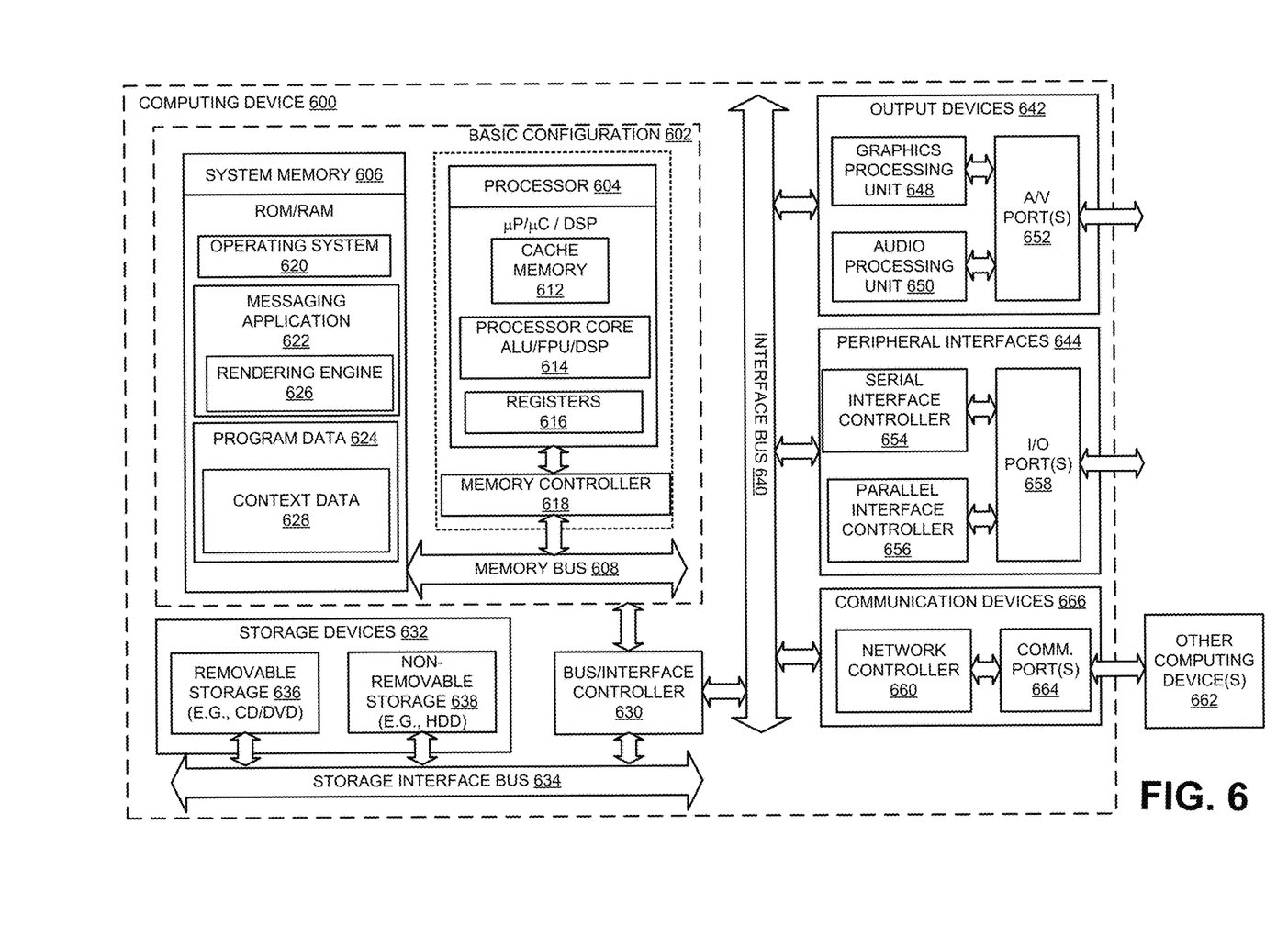
FIG. 6 is a block diagram of an example computing device, which may be used to transition a command UI between a toolbar UI and a full menu UI based on a use context.

FIG. 6 is a block diagram of an example computing device, which may be used to transition a command UI between a toolbar UI and a full menu UI based on a use context.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (g), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a messaging application 622, and a program data 624. The messaging application 622 may detect a request to interact with a message. A presentation mode may be identified based on a use context associated with the request. The use context may include a reading mode or an authoring mode. A command UI may be generated based on the presentation mode. The command UI may include a toolbar UI for the reading mode or a full menu UI for the authoring mode. The command UI may be displayed in proximity to the message within a messaging UI. Components of the messaging application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the messaging application 622, displayed by the touch based device. The program data 624 may also include, among other data, context data 628, or the like, as described herein. The context data 628 may include an intent associated with a request to interact with a message, or a screen size of the computing device 600, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to transition a command UI between a toolbar UI and a full menu UI based on a use context. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
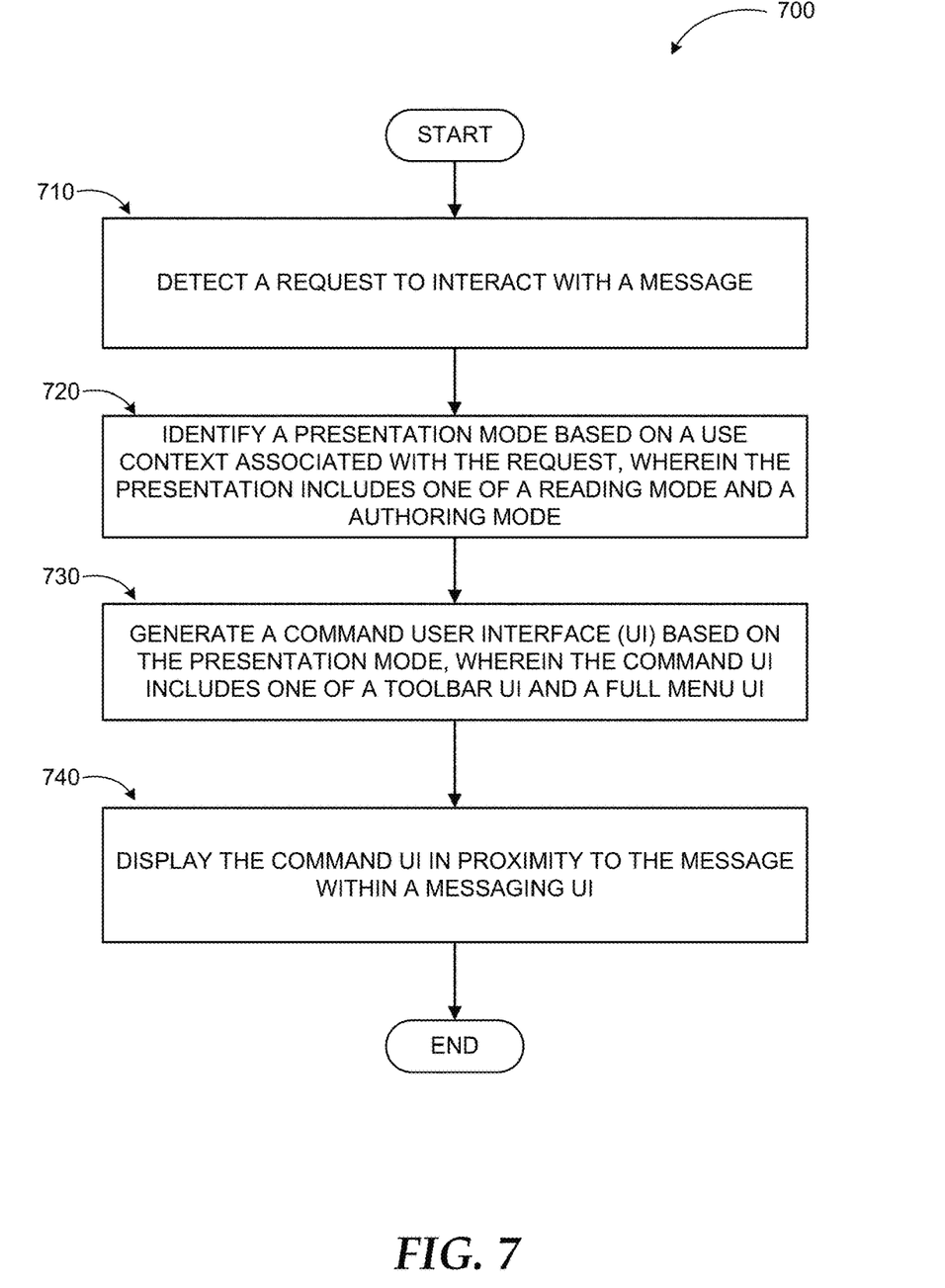
FIG. 7 illustrates a logic flow diagram for a process to transition a command UI between a toolbar UI and a full menu UI based on a use context, according to embodiments.

FIG. 7 illustrates a logic flow diagram for a process to transition a command UI between a toolbar UI and a full menu UI based on a use context, according to embodiments. Process 700 may be implemented on a computing device such as the computing device 600 or other system.

Process 700 begins with operation 710, where a request to interact with a message may be detected. The request may include an intent to read the message or an intent to author the message. At operation 720, a presentation mode may be identified based on a use context associated with the request. The use context may include a reading mode or an authoring mode.

At operation 730, a command UI may be generated based on the presentation mode. The command UI may include a toolbar UI for the reading mode or a full menu UI for the authoring mode. The toolbar UI may include reading mode commands with operations to consume the message. The full menu UI may include authoring mode commands that are partitioned to a format commands menu, an insert commands menu, or a review commands menu. At operation 740, the command UI may be displayed in proximity to the message within a messaging UI.

The operations included in process 700 are for illustration purposes. Transitioning of a command UI between a toolbar UI and a full menu UI based on a use context may be implemented by similar processes with fewer or additional steps, as well as in different order of operations using the principles described herein.

According to some examples, a computing device to transition a command user interface (UI) between a toolbar UI and a full menu UI based on a use context may be described. The computing device may include a display device, a memory configured to store instructions associated with a messaging application and one or more processors coupled to the memory and the display device. The one or more processors may execute the messaging application in conjunction with the instructions stored in the memory. The messaging application may include a rendering engine configured to detect a request to interact with a message, identify a presentation mode based on the use context associated with the request, where the presentation mode includes one of a reading mode and an authoring mode, generate a command UI based on the identified presentation mode, where the command UI includes one of the toolbar UI and the full menu UI, and display, on the display device, the command UI in proximity to the message within a messaging application UI.

According to some examples, the rendering engine may be further configured to analyze the request to detect an intent to read the message, where the intent includes one or more of a read selection to read the message and a read command to read the message and identify the reading mode as the presentation mode. The rendering engine may be further configured to place reading mode commands on the toolbar UI to present the toolbar UI as the command UI, where the reading mode commands include one or more of a reply command, a reply to all command, a forward command, and a delete command. The rendering engine may be further configured to create the toolbar UI as the command UI, where the toolbar UI includes a set of commands that are displayed within a layer and place the set of commands in one of a horizontal arrangement and a vertical arrangement based on one or more of a configuration setting of the messaging application UI and a user preference.

According to other examples, the rendering engine may be further configured to analyze the request to detect an intent to author the message, where the intent includes one or more of an authoring selection to author the message and an authoring command to author the message, identify the authoring mode as the presentation mode, and place authoring mode commands on the full menu UI to present the full menu UI as the command UI, where the full menu UI includes one or more of a set of format commands, a set of insert commands, a set of layout commands, a set of design commands, a set of view commands, and a set of review commands. The set of format commands may include commands associated with operations to modify a format of a content of the message, the set of insert commands includes commands associated with operations to insert a new content into the message, and the set of review commands includes commands associated with operations to review changes to the content of the message.

According to further examples, the rendering engine may be further configured to analyze a screen size of the display device to identify the use context based on the screen size. The rendering engine may be further configured to detect the screen size as within a range that includes a mobile device screen, identify the presentation mode as the reading mode, and place reading mode commands on the toolbar UI to present the toolbar UI as the command UI. The rendering engine may be further configured to detect the screen size as larger than a range that includes a mobile device screen, identify the presentation mode as the authoring mode, and place authoring mode commands on the full menu UI to present the full menu UI as the command UI.

According to some examples, a method executed on a computing device to transition a command user interface (UI) between a toolbar UI and a full menu UI based on a use context may be described. The method may include detecting a request to interact with a message, where the request includes one of a first intent to read to message and a second intent to author the message, identifying a presentation mode based on the use context associated with the request, where the presentation mode includes one of a reading mode and an authoring mode, generating a command UI based on the identified presentation mode, where the command UI includes one of the toolbar UI and the full menu UI, and displaying the command UI in proximity to the message within a messaging UI.

According to other examples, the method may further include detecting an application platform of the messaging UI as a mobile application, and identifying the reading mode as the presentation mode, placing reading mode commands on the toolbar UI to present the toolbar UI as the command UI, positioning a subset of the reading mode commands on the toolbar UI based on a display size of the toolbar UI, positioning a menu command on the toolbar UI with operations to display a hidden subset of the reading mode commands, and in response to an identification of an ergonomic preference, presenting the toolbar UI in a location on the messaging UI based on the ergonomic preference. The ergonomic preference may include a request to display the command UI within an interactive section of the messaging UI, among others.

According to further examples, the method may further include detecting an application platform of the messaging UI as a desktop application, identifying the authoring mode as the presentation mode, placing authoring mode commands on the full menu UI to present the full menu UI as the command UI, partitioning the authoring mode commands to a plurality of command group menus, displaying one of the plurality of command group menus based on the use context, and in response to a detection of an ergonomic preference, presenting the full menu UI in a location on the messaging UI based on the ergonomic preference. The method may further include detecting an application platform of the messaging UI as a web based application and identifying a screen size of a display device displaying the web based application to select one of the reading mode and the authoring mode as the presentation mode.

According to some examples, a computer-readable memory device with instructions stored thereon to transition a command user interface (UI) between a toolbar UI and a full menu UI based on a use context may be described. The instructions may include actions that are similar to the method described above.

According to some examples a means to transition a command user interface (UI) between a toolbar UI and a full menu UI based on a use context may be described. The means to transition a command user interface (UI) between a toolbar UI and a full menu UI based on a use context may include a means to detect a request to interact with a message, a means to identify a presentation mode based on the use context associated with the request, where the presentation mode includes one of a reading mode and an authoring mode, a means to generate a command UI based on the identified presentation mode, where the command UI includes one of the toolbar UI and the full menu UI, and a means to display the command UI in proximity to the message within a messaging application UI.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to transition a command user interface (UI) between a toolbar UI and a full menu UI based on a use context, the computing device comprising:
a memory configured to store instructions associated with a messaging application;
one or more processors coupled to the memory, wherein the one or more processors in conjunction with the instructions stored in the memory are configured to:
detect a request to interact with a message;
analyze attributes associated with a usage of the message, wherein the attributes include at least a historical use pattern associated with the usage of the message;
automatically identify the use context based on the analysis of the attributes associated with the usage of the message;
automatically identify one of a reading mode and an authoring mode as a presentation mode based on the use context;
automatically select one of the toolbar UI and the full menu UI as the command UI based on the identified presentation mode, wherein the toolbar UI includes reading mode commands and the full menu UI includes authoring mode commands; and
provide for display the selected command UI in the identified presentation mode.

2. The computing device of claim 1, wherein the one or more processors are further configured to:
automatically detect an intent to read the message, wherein the intent includes one or more of a read selection to read the message and a read command to read the message; and
automatically identify the reading mode as the presentation mode.

3. The computing device of claim 2, wherein the one or more processors are further configured to:
automatically place the reading mode commands on the toolbar UI to present the toolbar UI as the command UI, wherein the reading mode commands include one or more of a reply command, a reply to all command, a forward command, and a delete command.

4. The computing device of claim 2, wherein the one or more processors are further configured to:
automatically create the toolbar UI as the command UI, wherein the toolbar UI includes a set of commands that are displayed within a layer.

5. The computing device of claim 4, wherein the one or more processors are further configured to:
automatically place the set of commands in one of a horizontal arrangement and a vertical arrangement based on one or more of a configuration setting of a UI of the messaging application and a user preference.

6. The computing device of claim 1, wherein the one or more processors are further configured to:
automatically detect an intent to author the message, wherein the intent includes one or more of an authoring selection to author the message and an authoring command to author the message; and
automatically identify the authoring mode as the presentation mode.

7. The computing device of claim 6, wherein the one or more processors are further configured to:
automatically place the authoring mode commands on the full menu UI to present the full menu UI as the command UI, wherein the full menu UI includes one or more of a set of format commands, a set of insert commands, a set of layout commands, a set of design commands, a set of view commands, and a set of review commands.

8. The computing device of claim 7, wherein the set of format commands includes commands associated with operations to modify a format of a content of the message, the set of insert commands includes commands associated with operations to insert a new content into the message, and the set of review commands includes commands associated with operations to review changes to the content of the message.

9. The computing device of claim 1, wherein the one or more processors are further configured to:
automatically detect a screen size as within a range that includes a mobile device screen;
automatically identify the presentation mode as the reading mode; and
automatically place the reading mode commands on the toolbar UI to present the toolbar UI as the command UI.

10. The computing device of claim 1, wherein the one or more processors are further configured to:
automatically detect a screen size as larger than a range that includes a mobile device screen;
automatically identify the presentation mode as the authoring mode; and
automatically place the authoring mode commands on the full menu UI to present the full menu UI as the command UI.

11. A method executed on a computing device to transition a command user interface (UI) between a toolbar UI and a full menu UI based on a use context, the method comprising:
detecting a request to interact with a message, wherein the request includes one of a first intent to read the message and a second intent to author the message;
analyzing attributes associated with a usage of the message, wherein the attributes include at least a historical use pattern associated with the usage of the message;
automatically identifying the use context based on the analysis of the attributes associated with the usage of the message;
automatically identifying one of a reading mode and an authoring mode as a presentation mode based on the use context;
automatically selecting one of the toolbar UI and the full menu UI as the command UI based on the identified presentation mode, wherein the toolbar UI includes reading mode commands and the full menu UI includes authoring mode commands; and
displaying the selected command UI in the identified presentation mode.

12. The method of claim 11, further comprising:
detecting an application platform of a messaging UI as a mobile application; and
automatically identifying the reading mode as the presentation mode.

13. The method of claim 12, further comprising:
automatically placing the reading mode commands on the toolbar UI to present the toolbar UI as the command UI;
automatically positioning a subset of the reading mode commands on the toolbar UI based on a display size of the toolbar UI;
automatically positioning a menu command on the toolbar UI with operations to display a hidden subset of the reading mode commands; and in response to an identification of an ergonomic preference, presenting the toolbar UI in a location on the messaging UI based on the ergonomic preference.

14. The method of claim 11, further comprising:
detecting an application platform of a messaging UI as a desktop application; and
automatically identifying the authoring mode as the presentation mode.

15. The method of claim 14, further comprising:
automatically placing the authoring mode commands on the full menu UI to present the full menu UI as the command UI;
automatically partitioning the authoring mode commands to a plurality of command group menus;
displaying one of the plurality of command group menus based on the use context; and
in response to a detection of an ergonomic preference, presenting the full menu UI in a location on the messaging UI based on the ergonomic preference.

16. A computer-readable memory device with instructions stored thereon to transition a command user interface (UI) between a toolbar UI and a full menu UI based on a use context, the instructions comprising:
detecting a request to interact with a message, wherein the request includes one of a first intent to read to message and a second intent to author the message;
analyzing attributes associated with a usage of the message, wherein the attributes include at least a historical use pattern associated with the usage of the message;
automatically identifying the use context based on the analysis of the attributes associated with the usage of the message;
automatically identifying one of a reading mode and an authoring mode as a presentation mode based on the use context;
automatically selecting one of the toolbar UI and the full menu UI as the command UI based on the identified presentation mode, wherein the toolbar UI includes reading mode commands and the full menu UI includes authoring mode commands; and
displaying the selected command UI in the identified presentation mode.

17. The computer-readable memory device of claim 16, wherein the instructions further comprise:
detecting an intent to read the message, wherein the intent includes one or more of a read selection to read the message and a read command to read the message;
automatically identifying the reading mode as the presentation mode; and
automatically placing the reading mode commands on the toolbar UI to present the toolbar UI as the command UI, wherein the reading mode commands include one or more of a reply command, a reply to all command, a forward command, and a delete command.

18. The computer-readable memory device of claim 16, wherein the instructions further comprise:
detecting an application platform of a messaging UI as a desktop application;
automatically identifying the authoring mode as the presentation mode;
automatically placing the authoring mode commands on the full menu UI to present the full menu UI as the command UI;
automatically partitioning the authoring mode commands to a plurality of command group menus; and
displaying one of the plurality of command group menus based on the use context.

* * * * *